(12) United States Patent
Bennett

(10) Patent No.: US 12,365,451 B2
(45) Date of Patent: Jul. 22, 2025

(54) AIRCRAFT LANDING GEAR SHOCK ABSORBER STRUT

(71) Applicant: SAFRAN LANDING SYSTEMS UK LTD., Gloucester (GB)

(72) Inventor: Ian Robert Bennett, Gloucester (GB)

(73) Assignee: SAAFRAN LANDING SYSTEMS UK LTD., Gloucester (GB)

( * ) Notice: Subject to any disclaimer, the term of this patent is extended or adjusted under 35 U.S.C. 154(b) by 0 days.

(21) Appl. No.: 18/580,479

(22) PCT Filed: Jul. 15, 2022

(86) PCT No.: PCT/EP2022/069861
§ 371 (c)(1),
(2) Date: Jan. 18, 2024

(87) PCT Pub. No.: WO2023/001704
PCT Pub. Date: Jan. 26, 2023

(65) Prior Publication Data
US 2024/0326992 A1 Oct. 3, 2024

(30) Foreign Application Priority Data
Jul. 21, 2021 (EP) ..................................... 21186935

(51) Int. Cl.
*B64C 25/60* (2006.01)
*B64C 25/12* (2006.01)

(52) U.S. Cl.
CPC .............. *B64C 25/60* (2013.01); *B64C 25/12* (2013.01)

(58) Field of Classification Search
CPC ................................ B64C 25/60; B64C 25/12
See application file for complete search history.

(56) References Cited

U.S. PATENT DOCUMENTS

| 2,159,058 A * | 5/1939 | Taylor | B64C 35/008 |
| | | | 244/101 |
| 2010/0219290 A1* | 9/2010 | Luce | B64C 25/22 |
| | | | 244/102 SL |

(Continued)

FOREIGN PATENT DOCUMENTS

| EP | 3345828 A1 | 7/2018 |
| EP | 3395681 A1 | 10/2018 |
| EP | 3561319 A1 | 10/2019 |

OTHER PUBLICATIONS

European Search Report and Search Opinion received for European Application No. 21186935.9, mailed on Jan. 25, 2022, 7 pages.

(Continued)

*Primary Examiner* — Tye William Abell
(74) *Attorney, Agent, or Firm* — WOMBLE BOND DICKINSON (US) LLP

(57) ABSTRACT

An aircraft landing gear shock absorber strut including an outer cylinder having a bore defining an opening; an inner cylinder having a first end region movably coupled within the bore and a second end region which projects out of the opening. The inner cylinder being arranged to move along a longitudinal axis of the bore between a first condition and a second condition and is biased by a spring force to assume the second condition. A mechanical outstop is arranged to engage an abutment surface of the inner cylinder to limit extension of the shock absorber strut; and a rotatable member drives the out stop axially to move the inner cylinder from the second condition towards the first condition. The rotatable member is arranged such that the spring force cannot rotate the rotatable member to allow the shock absorber strut to extend.

19 Claims, 16 Drawing Sheets

(56) References Cited

U.S. PATENT DOCUMENTS

| | | | | |
|---|---|---|---|---|
| 2013/0299631 | A1* | 11/2013 | Tucker | B64C 25/14 |
| | | | | 244/102 R |
| 2018/0194460 | A1* | 7/2018 | Luce | B64C 25/22 |
| 2018/0312245 | A1* | 11/2018 | Klim | B64C 25/60 |
| 2019/0331156 | A1* | 10/2019 | Hilliard | B64C 25/58 |

OTHER PUBLICATIONS

International Search Report and Written Opinion received for PCT Patent Application No. PCT/EP2022/069861, mailed on Oct. 14, 2022, 10 pages.
Office Action received for European Application No. 21186935.9, mailed on Nov. 14, 2023, 5 pages.
International Preliminary Report on Patentability received for PCT Patent Application No. PCT/EP2022/069861, mailed on Feb. 1, 2024, 8 pages.
Office Action received for European Application No. 21186935.9, mailed on Jan. 17, 2025, 6 pages.

\* cited by examiner

AIRCRAFT LANDING GEAR SHOCK ABSORBER STRUT

BACKGROUND TO THE INVENTION

It is common for an aircraft landing gear assembly to include a main hydraulic shock absorber strut having an upper end arranged to be pivotally coupled to the underside of the aircraft and a lower end coupled to a wheel and brake assembly.

Such shock absorber struts can comprise an outer cylinder and an inner cylinder arranged to telescope relative to the outer cylinder. The shock absorber strut can be compressed and extended as the inner cylinder moves relative to the outer cylinder. The two portions are coupled together to define a chamber containing oil and in some cases a gas. As the shock absorber is compressed, oil within the chamber is forced through damping orifices and, where gas is also provided, the gas is compressed, in order to dampen landing loads. The compressed gas serves as a spring to lengthen the shock absorber as applied external load decreases. Recoil damping orifices can be provided to restrict the flow of oil to the annulus as the shock absorber extends.

An aircraft landing gear bay is a space within an aircraft that is configured to accommodate a stowed landing gear. The landing gear may have been designed specifically for the aircraft.

It can be desirable for the main strut of a landing gear to be longer than a standard landing gear main strut for a particular aircraft in order to raise the aircraft higher to improve ground clearance. However, unless the landing gear bay is redesigned to accommodate the increase in length, the landing gear must still be capable of retracting into the existing space within the bay. Hence the landing gear is required to shorten on retraction.

Various means are known by which to shorten a landing gear on retraction. This can involve a dedicated shortening mechanism which must be attached to a structural part of the landing gear bay.

The present inventor has devised a new type of shortening mechanism that can improve safety.

SUMMARY OF INVENTION

According to a first aspect of the invention, there is provided an aircraft landing gear shock absorber strut comprising:
  an outer cylinder having a bore defining an opening;
  an inner cylinder having a first end region movably coupled within the bore and a second end region which projects out of the opening, the inner cylinder being arranged to move along a longitudinal axis of the bore between a first condition in which the shock absorber strut is compressed and a second condition in which the shock absorber strut is extended, the inner cylinder being biased by a spring force to assume the second condition;
  a mechanical outstop arranged to engage or contact an abutment surface of the inner cylinder to limit extension of the shock absorber strut; and
  a rotatable member distinct from the inner cylinder and defining a threaded surface comprising a plurality of threads configured to drive the outstop axially as the rotatable member is rotated by at least 360 degrees to move the inner cylinder from the second condition towards the first condition to compress the shock absorber strut, the rotatable member being arranged such that the spring force cannot rotate the rotatable member to allow the shock absorber strut to extend.

Thus, the shock absorber strut according to the first aspect includes a non-back-driving screw thread arranged to bi-directionally drive the outstop along the bore such that the outstop can move the inner cylinder to compress the shock absorber strut against the spring force to shorten the shock absorber strut for stowage and subsequently the outstop can be moved in an opposite axial direction to a position where it permits the shock absorber strut to extend. The present inventor has recognised that such an arrangement can reduce the likelihood of a compressed shock absorber strut accidentally extending when stowed in a landing gear bay, which could damage the bay and/or inhibit deployment of the landing gear, since the shock absorber strut spring force cannot back drive the screw thread to cause rotation of the rotatable member. As such, damage or disconnection of the external parts would not cause extension of the shock absorber, hence the gear can still be lowered and damage avoided.

The threads of the threaded surface can have a screw helix angle less than 45 degrees. It is preferred that the screw helix angle is between 0.1 degree and five degrees so as to provide a balance between being highly resistant to back-driving and axial movement of the outstop due to rotation of the rotatable member.

The threaded surface can have at least three threads, preferably between six and one hundred threads. As will be appreciated, the number of threads can depend upon the detail configuration, the size of the gear and the amount of shortening required.

The outstop can include a threaded counter surface arranged in mating engagement with the threaded surface, which can increase the amount of contact surface area used to drive the outstop and react back-driving from the spring force.

The outstop can be moveably coupled to the outer cylinder so as to permit axial movement relative to the outer cylinder but inhibit rotation with the rotatable member. This can provide efficient conversion of rotation of the rotatable member into axial movement of the outstop.

The inner cylinder can include a radially enlarged head at the first end region having an axial face defining the abutment surface.

The rotatable member can be mounted within the bore, within an annulus between the inner cylinder and outer cylinder.

The rotatable member can comprise a hollow cylindrical collar, the inner surface of which defines the threaded surface.

The outstop can be defined by an axial face of an annular gland member arranged to seal the shock absorber strut, the inner diameter of the rotatable collar being greater than the outer diameter of the gland, the outer cylindrical surface of the gland defining the threaded counter surface. Such an arrangement can enable the rotatable member to be incorporated without the addition of further static or dynamic seals relative to a conventional aircraft landing gear shock absorber strut.

Alternatively, the rotatable member can comprise a first hollow cylindrical member having an inner cylindrical surface portion defining the threaded surface and the outstop can be defined by an axial face of a second hollow cylindrical member having an outer cylindrical surface portion defining the threaded counter surface, the inner diameter of the first cylindrical member being greater than the outer diameter of the second cylindrical member such that the second cylindrical member can be driven axially into and out of the first cylindrical member. Both the first and second cylindrical members are distinct from a gland member arranged to seal the shock absorber strut.

The outer cylinder can include a drive passage through the sidewall for a rotatable drive member to engage an outer surface of the rotatable member to cause rotation of the rotatable member Alternatively, the shock absorbing strut can comprise an annular gland member arranged to seal the shock absorber strut, the gland member including a drive bore through which a rotatable drive pin extends, the gland further including a threaded bore communicating with the drive bore and defining the threaded counter surface, the rotatable member comprising a finger member having a first end region defining the threaded portion and being in mating engagement with the threaded bore and a second end defining the outstop, the drive pin being coupled to the finger member via a keyed slot arranged to permit relative axial movement between the drive pin and finger member and inhibit relative rotation between the drive pin and finger member.

Alternatively, the finger member can be splined or keyed against rotation in the gland member and driven by a rotating internal thread. Anti-rotation can provided by spline, key or external links.

A dynamic seal can be provided between the drive bore and the drive pin, which is relatively small in size in comparison to conventional dynamic seals located in the gland member.

Alternatively, the stop member can be defined by an orifice support tube having a first end within the outer cylinder and defining a radially enlarged head disposed within a blind bore of the inner cylinder, the opening of the blind bore being of smaller diameter than the radially enlarged head of the orifice support tube, the orifice support tube having a second end region which projects out of a second opening in an opposite axial face of the outer cylinder with respect to the opening, the second end region defining the threaded counter surface. In other embodiments, any suitable tube or rod can be provided rather than an orifice support tube.

According to a second aspect of the invention, there is provided an aircraft landing gear assembly comprising:
    the aircraft landing gear shock absorber strut according to the first aspect; and
    a wheel or other ground contacting assembly coupled to the shock absorber strut.

The landing gear assembly can comprise a side stay, drag stay or plunger lock arrangement coupled to the shock absorber strut and arranged to enable the shock absorber strut to be maintained in a deployed condition relative to an aircraft to which the landing gear assembly is movably coupled.

BRIEF DESCRIPTION OF THE DRAWINGS

Embodiments of the invention will now be described, strictly by way of example only, with reference to the accompanying drawings, of which.

DESCRIPTION OF EMBODIMENTS

Figure 1:
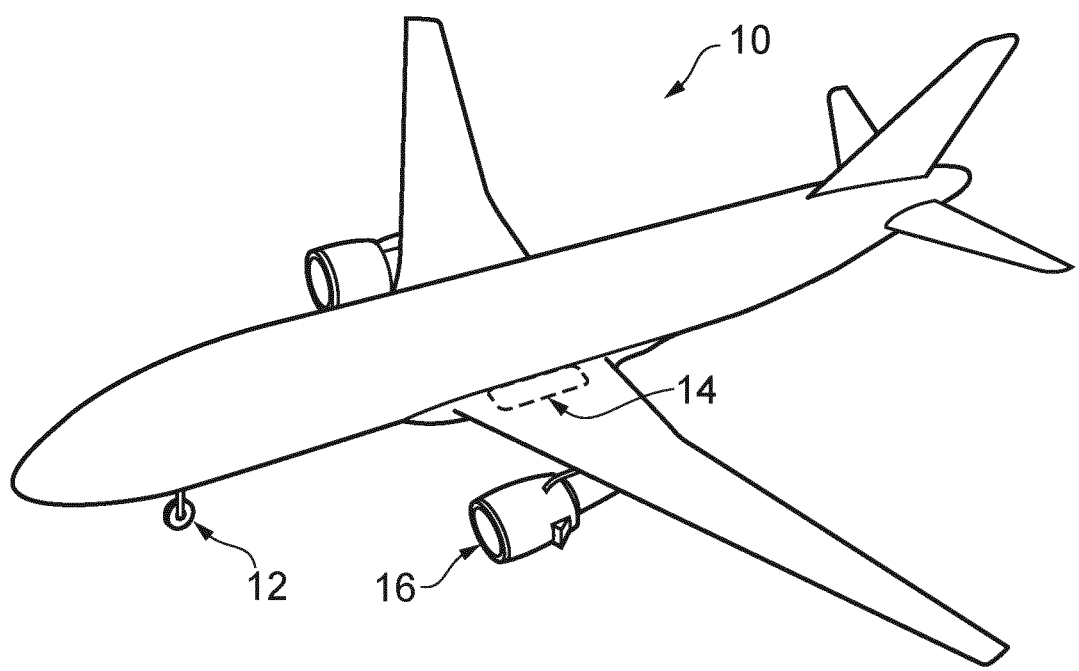
FIG. 1 is a diagram of an aircraft.

FIG. 1 is a diagram of an aircraft 10. The aircraft 10 includes assemblies such as a nose landing gear 12, main landing gear 14 and engines 16. The landing gear 12, 14 each includes a shock absorber strut for damping landing loads and supporting the weight of the aircraft 10 when it is on the ground. The term aircraft as used herein can include aeroplanes, helicopters and the like having mass in excess of 450 Kg.

Referring now to FIGS. 2a to 2e, an aircraft assembly, namely an aircraft landing gear assembly, is shown generally at 14. FIGS. 2a to 2e are an example of an aircraft landing gear assembly which can include a shock absorber strut according to an embodiment of the invention. It will however be appreciated that shock absorber struts according to embodiments of the invention can be used in a range of types of aircraft landing gear.

The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising an outer cylinder 26 and an inner cylinder 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the outer cylinder such that extension and retraction of the actuator results in movement of the outer cylinder between deployed and stowed conditions.

Figure 2A:
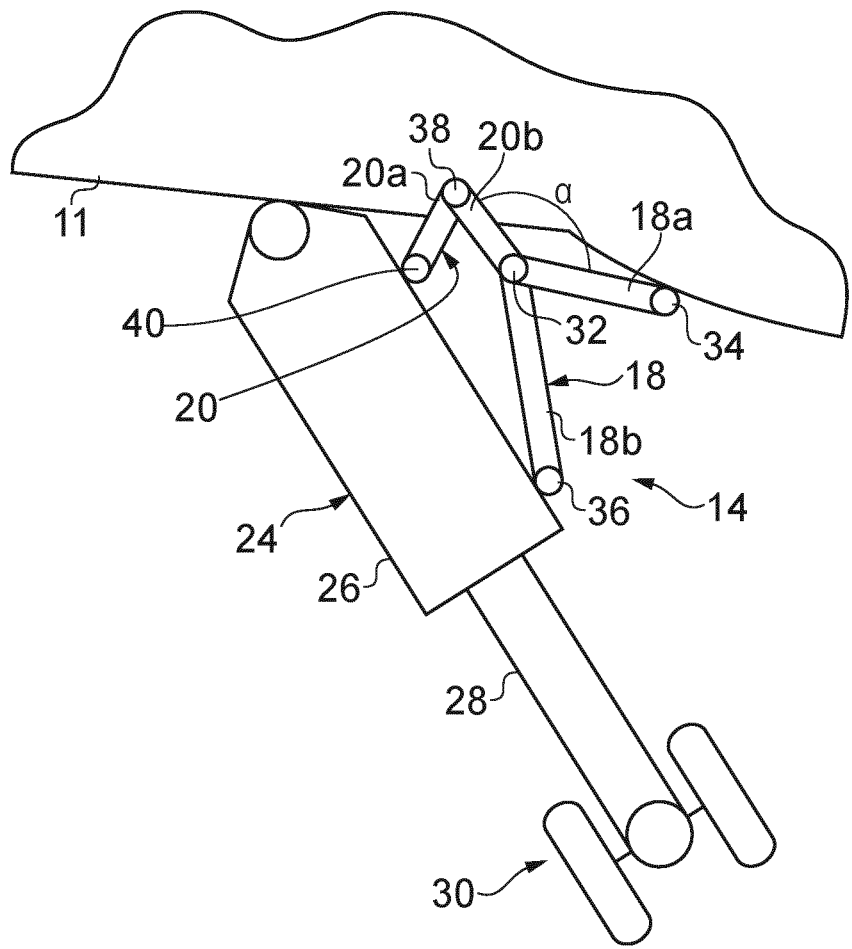
FIGS. 2a to 2e are diagrams of an aircraft landing gear assembly.
Figure 2B:
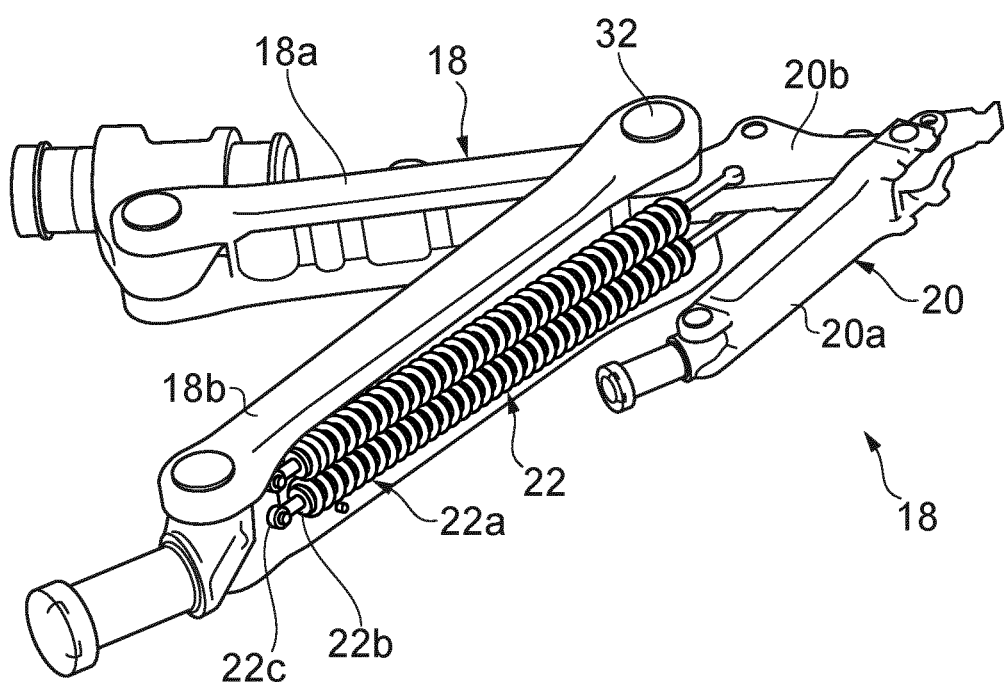
Figure 2C:
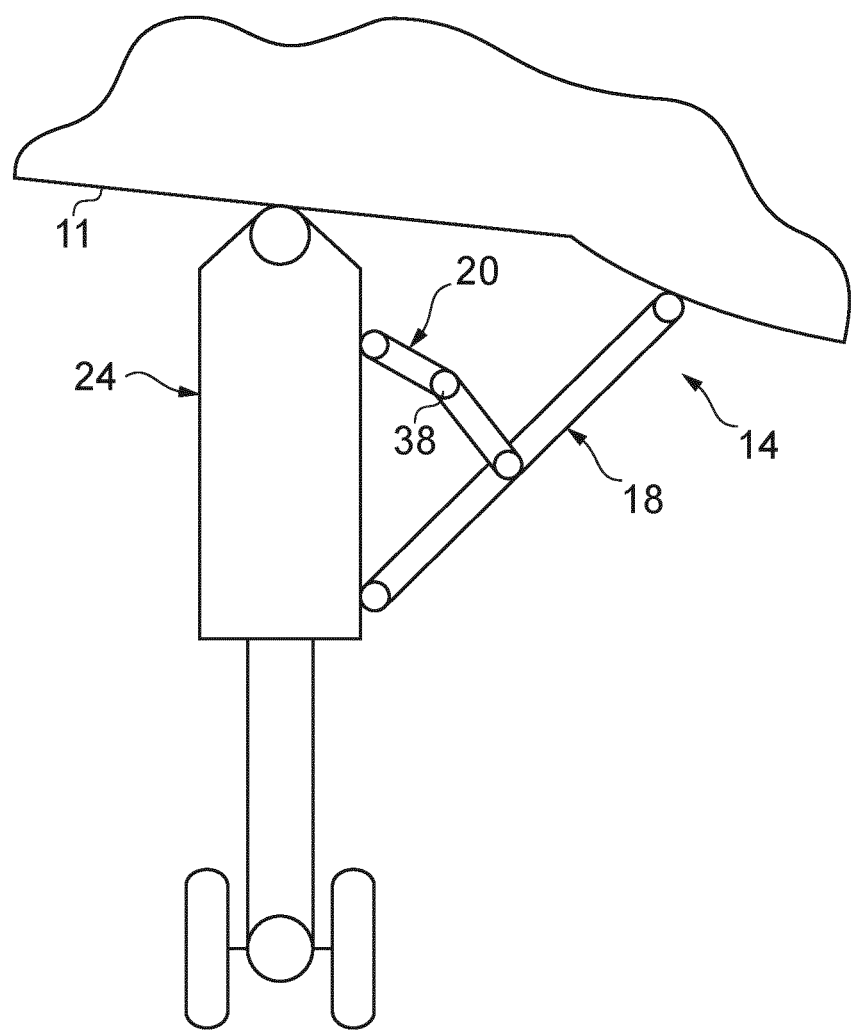

The stay 18 serves to support the orientation of the outer cylinder 26 when the landing gear is in the deployed condition. The stay 18 generally includes a two bar linkage that can be unfolded to assume a generally straight or aligned, over centre condition in which the stay 18 is locked to inhibit movement of the outer cylinder, as shown in FIGS. 2c and 2e. When the stay is broken, it no longer prevents pivotal movement of the outer cylinder 26 and the outer cylinder 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorber strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the outer cylinder 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the outer cylinder 26. A lower end of the lower link arm 20b defines a lug that is pivotally coupled to lugs of the stay arms 18a, 18b via the pivot pin 32. Lugs of the upper stay arm 18a are in this example disposed between the lugs of the lower stay arm 18b and the lugs of the lower link arm 20b.

Figure 2D:
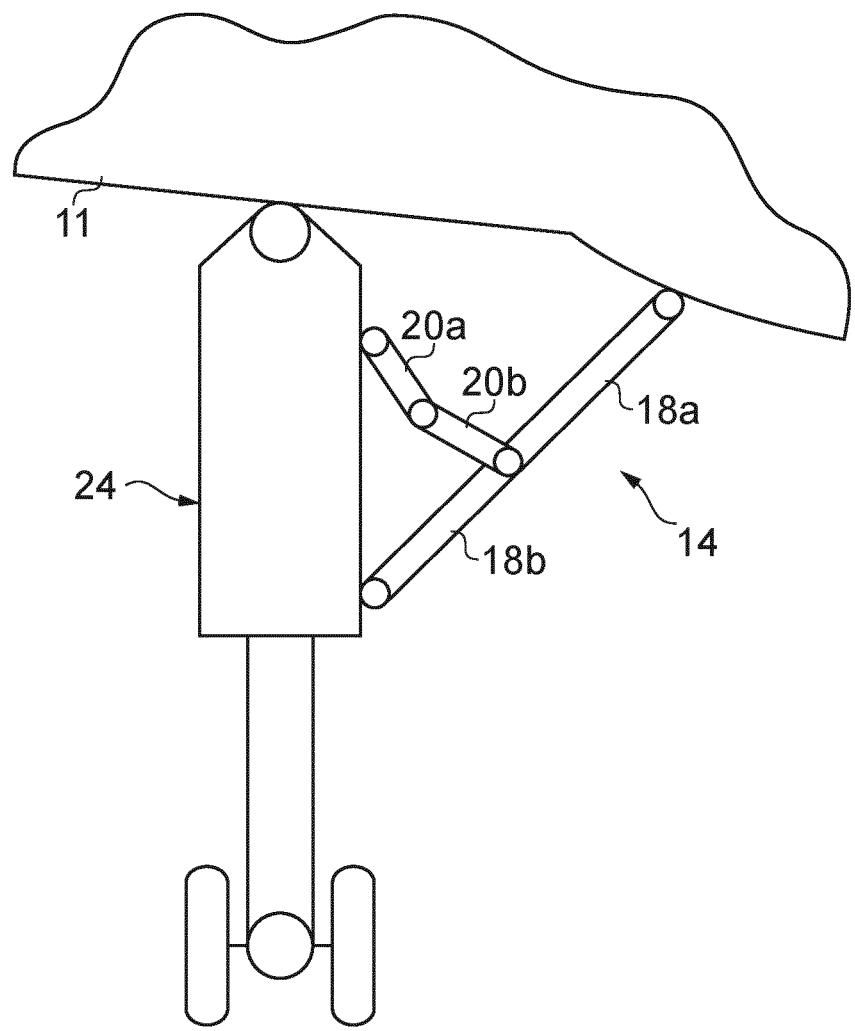
Figure 2E:
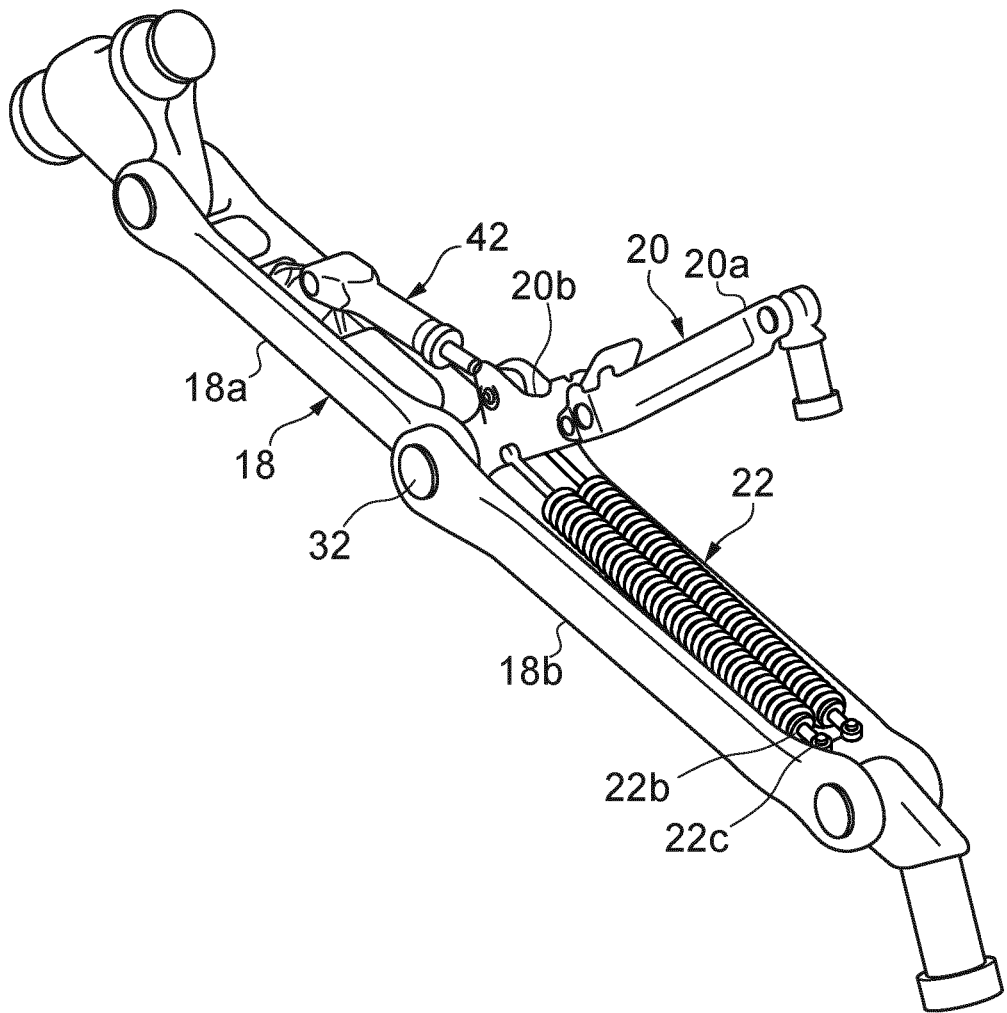

When the lock link 20 is in the locked condition, as illustrated in FIGS. 2d and 2e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the outer cylinder 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally metal coil springs, which can be coupled between the lock link and another part of the landing gear assembly, such as an arm of the stay assembly, as shown in FIGS. 2b and 2e.

The spring assembly 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and arranged to pivotally move the link arms 20a, b so as to 'lock' and 'unlock' the lock link 20, as illustrated in FIG. 2c. The actuator 42 can break the lock link 20 against the down lock spring bias, allowing the landing gear assembly to be folded and stowed as described previously.

Figure 3:
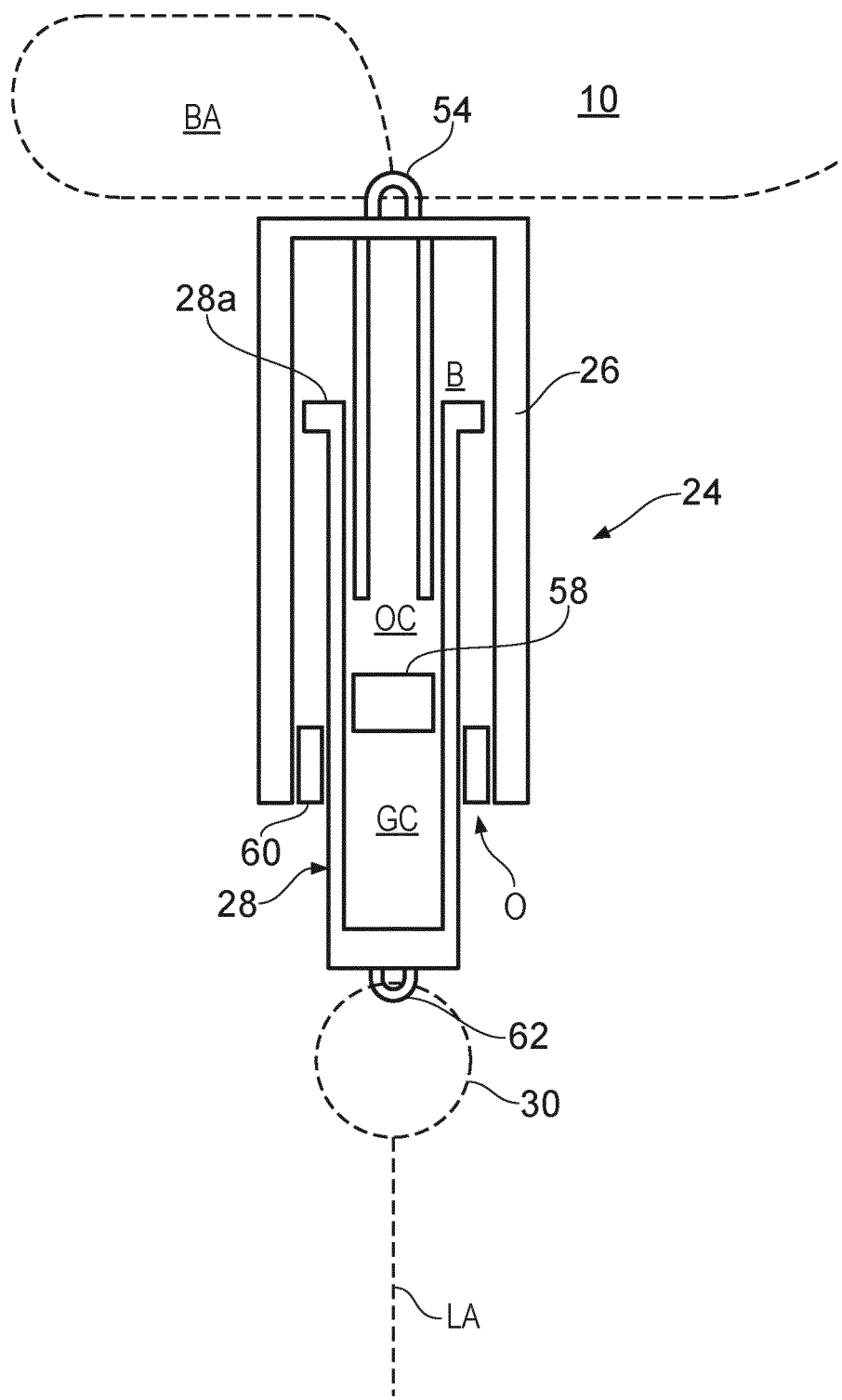
FIG. 3 is a schematic diagram of an aircraft landing gear shock absorber strut.

Referring to FIG. 3, an aircraft landing gear shock absorber strut is shown generally at 24.

The shock absorber strut 24 has an outer cylinder 26 having a bore B defining an opening O. In this embodiment the outer cylinder 26 is elongate. An upper end of the outer cylinder 26 can be provided with primary mounting bearing 54 via which the shock absorber strut 24 is arranged to me movably mounted to an aircraft 10 to move between a deployed condition for take-off and landing and a stowed condition for flight. When in the stowed condition, the shock absorber strut 24 can be received within a landing gear bay BA within the aircraft 10.

The shock absorber strut 24 has an inner cylinder 28 having a first end region, which can define a radially enlarged piston head 28a, movably coupled within the bore B and a second end region which projects out of the opening O. The inner cylinder 28 is arranged to move along a longitudinal axis LA of the bore B between a first condition in which the shock absorber strut 24 is compressed and a second condition in which the shock absorber strut 24 is extended.

The inner cylinder 28 is biased by a spring force to assume the second condition. The spring means which creates the spring force is in this embodiment a gas spring. The inner cylinder 28 includes a blind bore in which a separator piston 58 is slidably contained to move along the longitudinal axis LA. The separator piston 58 divides the blind bore into a gas chamber GC and an oil chamber OC. The gas chamber GC can contain a gas such as nitrogen which is compressed as the shock absorber strut 24 is compressed and provides the spring force biasing the shock absorber strut 24 to extend.

An annular gland member 60 is provided at the opening O to close the shock absorber strut 24 and can include bearings and dynamic seals which act on the other surface of the inner cylinder 28 to support it as it moves and confine oil within the shock absorber strut 24.

The free end of the inner cylinder 28 is provided with a bearing 62 for coupling to a wheel and brake assembly 30, bogie beam or the like.

In other examples, the shock absorber strut 24 can include an orifice support tube but no separator piston, in which case the gas chamber is formed by an upper region of the outer cylinder, while in other examples the shock absorber strut 24 can include a separator piston as shown but omit the orifice support tube. An orifice plate to restrict the oil flow towards the gas chamber can be provided according to type of example and convenience.

Figure 4:
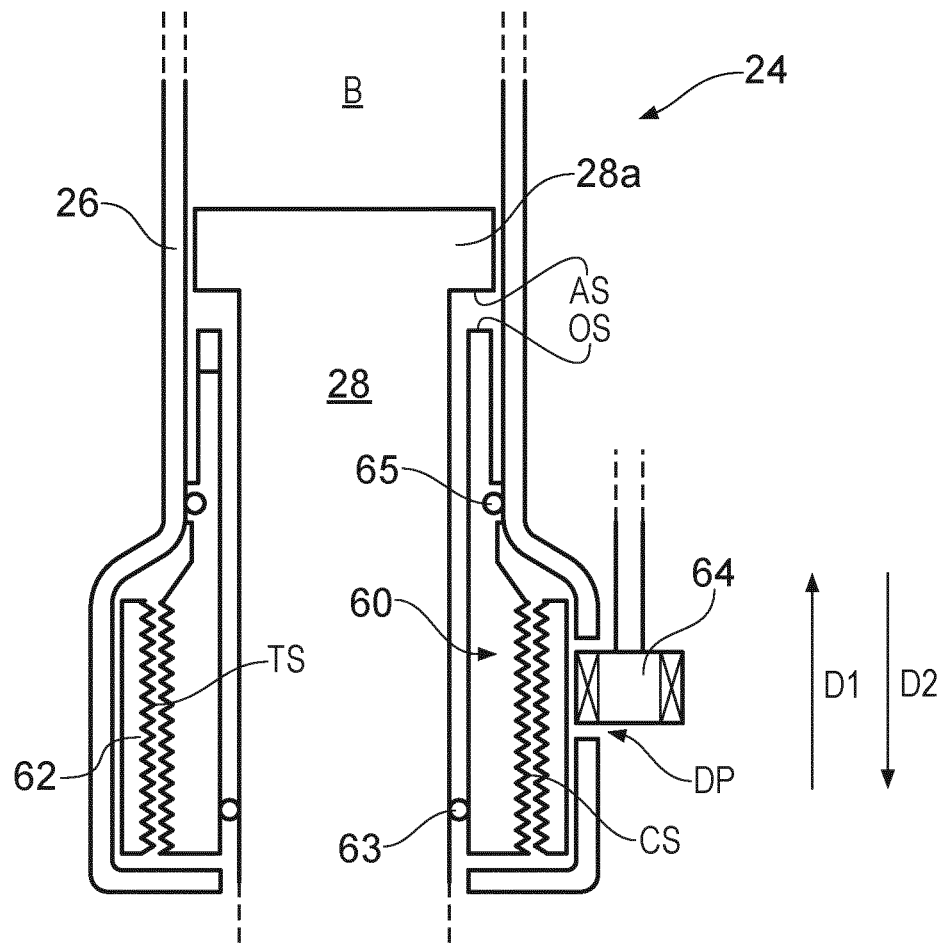
FIG. 4 is a schematic diagram of an aircraft landing gear shock absorber strut according to an embodiment of the invention.

Referring now to FIG. 4, the shock absorber strut 24 is provided with a shortening mechanism arranged to shorten the shock absorber strut 24 by compressing it against the spring force for stowage. The shortening mechanism according to embodiments of the invention utilises a screw thread to move the inner cylinder 28 and therefore is non-backdrivable by the spring force, meaning that in the event of failure of the shortening mechanism, the shock absorber strut 24 will not extend within the landing gear bay BA. More specifically, a mechanical outstop OS is arranged to contact an abutment surface AS of the inner cylinder 28 to limit extension of the shock absorber strut 24 and a rotatable member defining a threaded surface is configured to drive the out stop OS axially to move the inner cylinder 28 from the second condition towards the first condition to compress the shock absorber strut 24, the rotatable member being arranged such that the spring force cannot rotate the rotatable member to allow the shock absorber strut to extend.

In this embodiment, the outstop OS is defined by an axial face of the gland member 60 within the bore B. The abutment surface AS is defined by an axial face of the radially enlarged piston head 28a of the inner cylinder 28 which faces the gland member 60.

The rotatable member 62 is mounted within the bore, within an annulus between the inner cylinder 28 and outer cylinder 28. The rotatable member 62 is a hollow cylindrical collar, an inner surface of which defines the threaded surface TS. An outer cylindrical surface of the gland member 60 defines the threaded counter surface CS which mating engages the threaded surface TS. The inner diameter ID of the rotatable collar 62 is greater than the outer diameter OD of the gland member 60. It will however be appreciated that since the collar 62 and gland member 60 are engaged in a threaded manner, there will in practice be some overlap in diameters.

The lower end region of the outer cylinder 26 can be flared to accommodate the rotatable collar 62 and includes a drive passage DP through the sidewall for a rotatable drive member 64 to engage an outer surface of the rotatable collar 62 to cause rotation of the rotatable collar 62.

As the rotatable collar 62 is rotated in a first direction about the axis LA, the mating screw thread arrangement causes the gland member 60 to be driven axially in direction D1 into contact with the piston head 28a of the inner cylinder 28 and thereafter compressing the shock absorber strut 24 against the spring force. The gland member 60 is keyed to the outer cylinder 26 by way of longitudinal splines or the like (not shown) to inhibit relative rotation between gland member 60 and outer cylinder 26 about the axis LA.

As the rotatable collar 62 is rotated in a second direction about the axis LA opposite to the first direction, the mating screw thread arrangement causes the gland member to be driven axially in the opposite direction D2 away from the piston head 28a of the inner cylinder 28, permitting the spring force to extend the shock absorber strut 24.

Such an arrangement can enable the rotatable member to be incorporated without the addition of further static or dynamic seals relative to a conventional aircraft landing gear shock absorber strut. One or more inner dynamic seals 63 can be mounted on the inner face of the gland member 60 to act upon the outer surface of the inner cylinder 28 and one or more outer dynamic seal 65 can be mounted on the outer face of the gland member 60 to act upon the inner surface of the outer cylinder 26.

As one of the many alternatives, the inner dynamic seal can instead be between inner cylinder 28 and the bottom of the outer cylinder 26 and/or the drive passage DP can be encased and a rotary seal provided to act on the driveshaft to the rotatable drive member 64.

Figure 5:
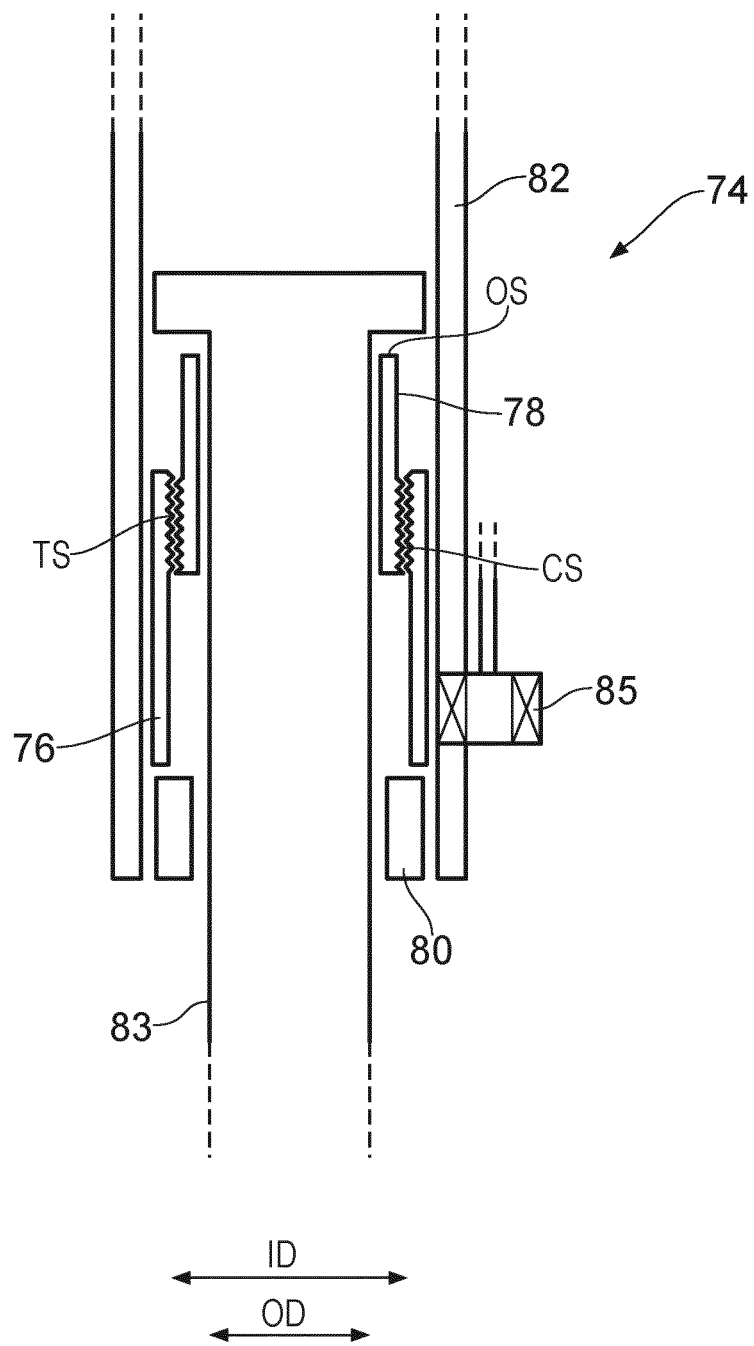
FIG. 5 is a schematic diagram of an aircraft landing gear shock absorber strut according to an embodiment of the invention.

FIG. 5 shows an alternative embodiment of a shock absorber strut 74, which is similar to the shock absorber strut 24 and for brevity the following description will focus on the differences.

In this embodiment, the rotatable member is a first hollow cylindrical 76 member having an upper, inner cylindrical surface portion defining the threaded surface TS. The outstop OS is defined by an axial face of a second hollow cylindrical member 78 having a lower, outer cylindrical surface portion defining the threaded counter surface CS. The inner diameter ID of the first cylindrical member 76 is greater than the outer diameter OD of the second cylindrical member 78 such that the second cylindrical member 78 can be driven axially into and out of the first cylindrical member 76. Analogously to the previous embodiment, the second cylindrical member 78 is provided with a key, dowel or spline to stop it rotating relative to inner cylinder 83 or the outer cylinder 82. Both the first and second cylindrical members 76, 78 are distinct from a gland member 80 arranged to seal the shock absorber strut.

Various seal arrangements can be provided, such as one or more rotary seals (not shown) on the first cylindrical member 76 to act against the outer cylinder 82 with conventional dynamic seals (not shown) between the gland member 80 and inner cylinder 83. In another example, sliding seals (not shown) can be provided on the inner face and outer faces of the second cylindrical member 78 to act against the inner and outer cylinders 83, 82 respectively.

As with the previous embodiment, the outer cylinder 82 includes a drive passage DP through the sidewall for a rotatable drive member 85 to engage an outer surface of the first cylindrical member 76 to cause rotation of the first cylindrical member 76.

Dynamic seals (not shown) can be provided between the one or both of the first and second cylindrical members 76, 78 and the inner wall of the outer cylinder 82 to inhibit oil leaking out via the drive passage DP.

Figure 10:
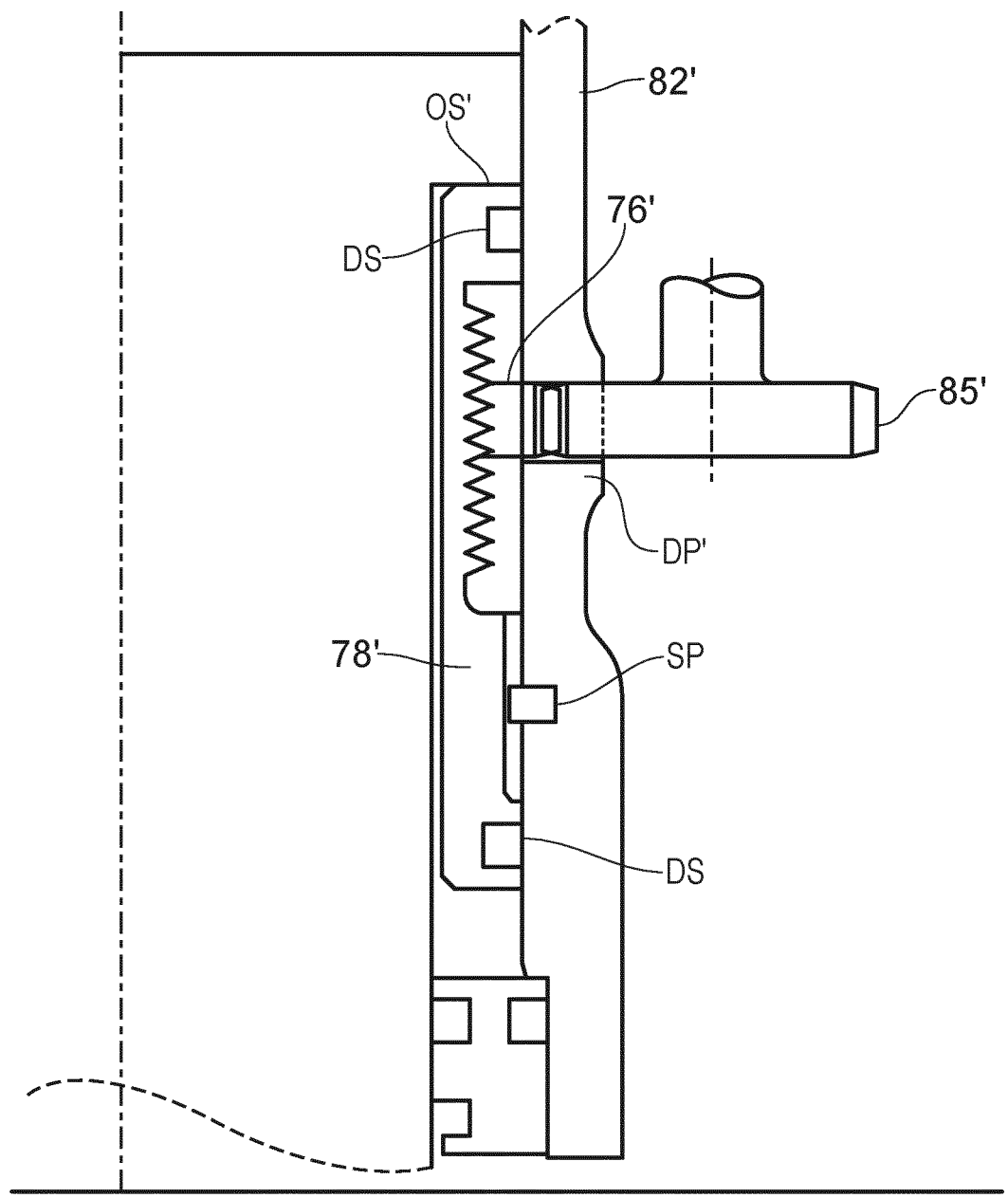
FIG. 10 is a schematic diagram of an aircraft landing gear shock absorber strut according to an embodiment of the invention which is similar to that of FIG. 5.

In an alternative embodiment of this type, shown in FIG. 10, the drive passage DP' and rotatable drive member 85' can be located higher on the outer cylinder 82' and arranged to drive a relatively short rotating member in the form of a rotating nut 76' disposed on the outside of, and in a generally central region with respect to, a relatively long hollow cylinder 78' defining the outstop OS'. Dynamic seals DS can be provided at the top and bottom of the relatively long hollow cylinder acting on the inner wall of the outer cylinder 82'. The keying arrangement between the hollow cylinder 78' and outer cylinder 82' is shown at SP. The outer diameter of the rotating nut 76' can be less than the inner diameter of the outer cylinder 82' and assembled from bottom, or posted in through a letterbox slot.

Figure 11:
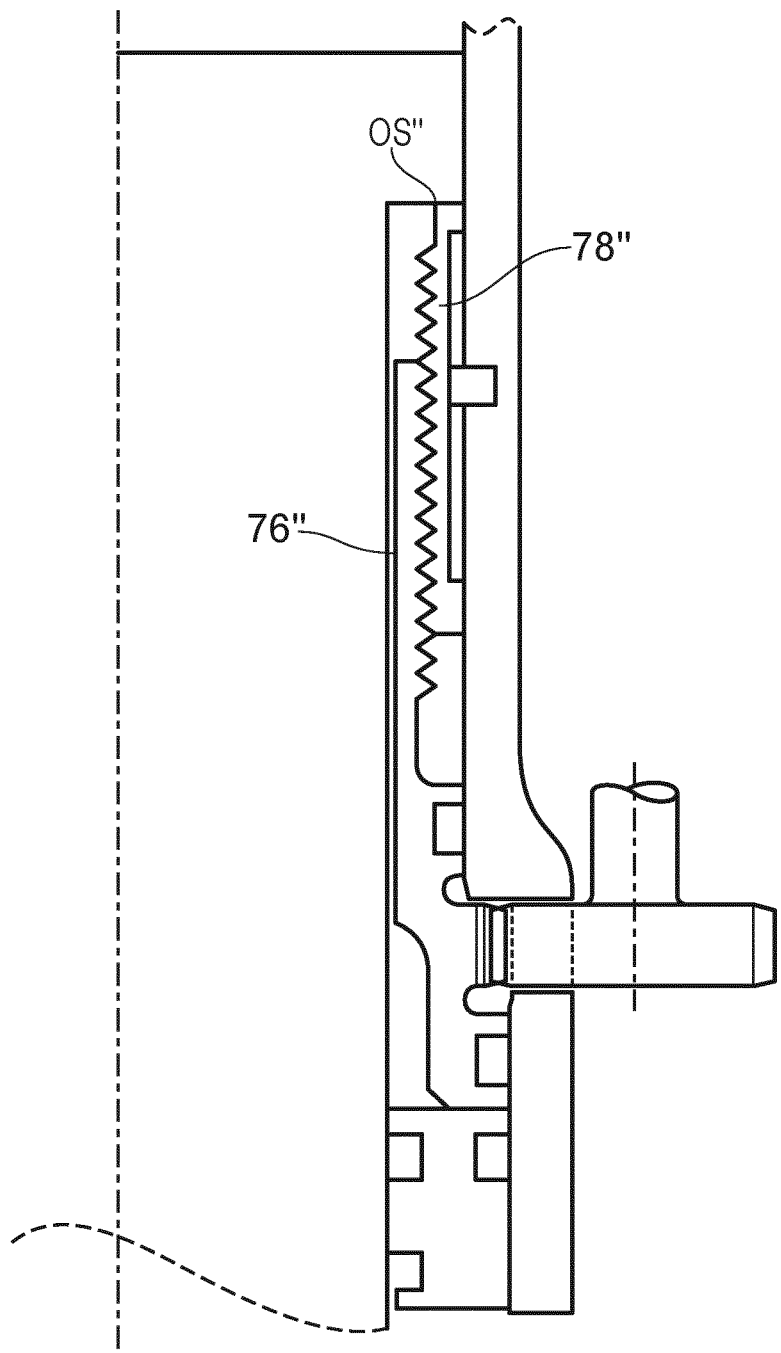
FIG. 11 is a schematic diagram of an aircraft landing gear shock absorber strut according to an embodiment of the invention which is similar to that of FIG. 5.

In a further alternative embodiment of this type, shown in FIG. 11, the arrangement of the shock absorbing strut is similar to that of FIG. 5 except that the first and second cylindrical members 76", 78" are reversed, with the rotatably driven, first rotatable member 76" being mounted inside the axially driven second cylindrical member 78" which defines the outstop OS".

Figure 6:
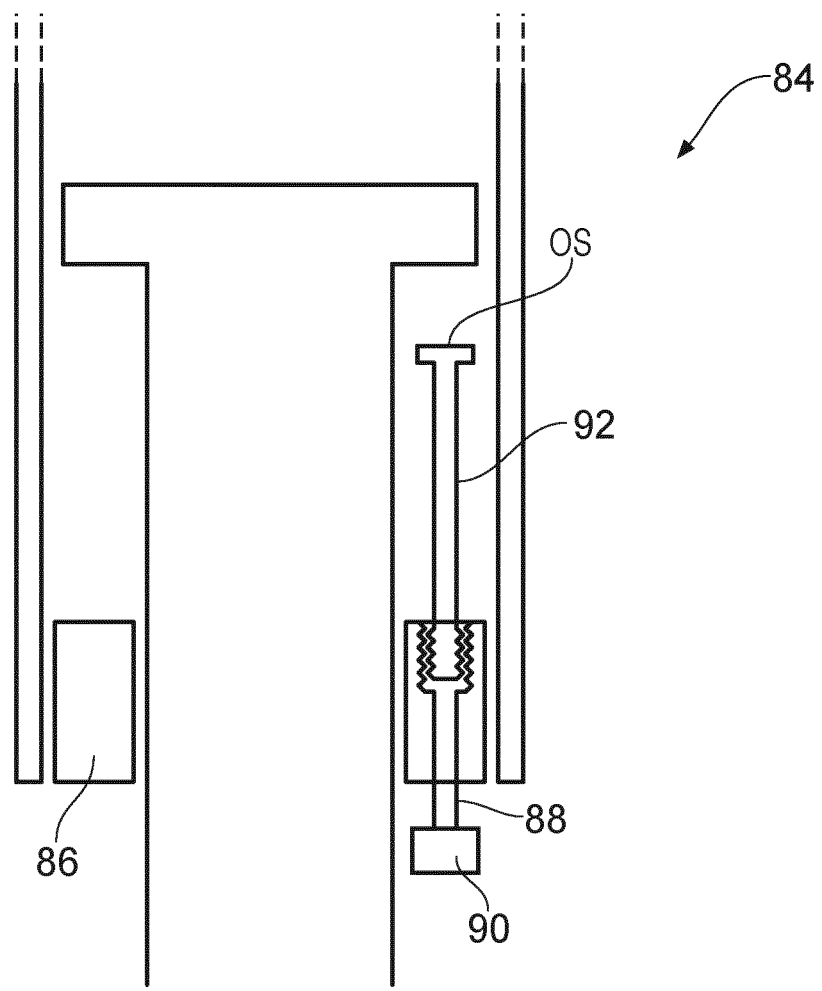
FIG. 6 is a schematic diagram of an aircraft landing gear shock absorber strut according to an embodiment of the invention.
Figure 7:
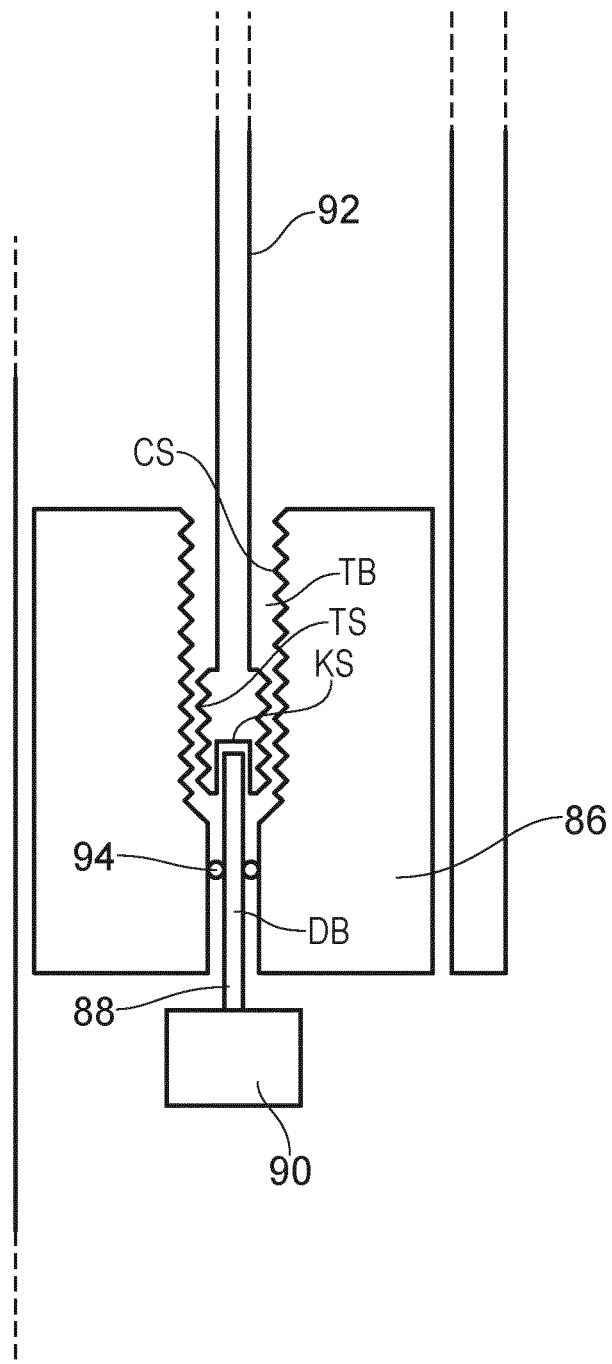
FIG. 7 is a schematic diagram focusing on the gland member of the shock absorber strut of FIG. 6.

FIGS. 6 and 7 show an alternative embodiment of a shock absorber strut 84, which is similar to the shock absorber strut 24 and for brevity the following description will focus on the differences.

In this embodiment, the shock absorbing strut 84 has an annular gland member 86 arranged to seal the shock absorber strut 84 and which includes a drive bore DB through which a rotatable, elongate drive pin 88 extends. The gland member 86 also has a threaded bore TB communicating with the drive bore in a coaxial manner. The threaded bore defines the threaded counter surface CS. The rotatable member is a finger member 92 having a lower end region defining the threaded surface TS and being in mating engagement with the threaded counter surface CS which defines the threaded bore TB. The upper end of the finger member 92 defines the outstop OS. The drive pin 88 is coupled to the finger member 92 via a keyed slot KS which extends axially into the bottom face of the finger member 92 and is arranged to permit relative axial movement between the drive pin 88 and finger member 92 and inhibit relative rotation between them. The drive pin can be rotated by a drive arrangement 90, causing the finger member 92 to rotate and be driven axially along the threaded bore TB. A dynamic seal 94 can be provided between the inner surface that defines the drive bore DB and the drive pin 88, which is relatively small in size in comparison to conventional dynamic seals located in the gland member.

A plurality of finger member arrangements can be provided around the gland member 86. It should be noted that the finger member 92 can be threaded in the gland and driven by a spline or other keyed slot, or alternatively splined in the gland and a thread rotates inside it.

Figure 8:
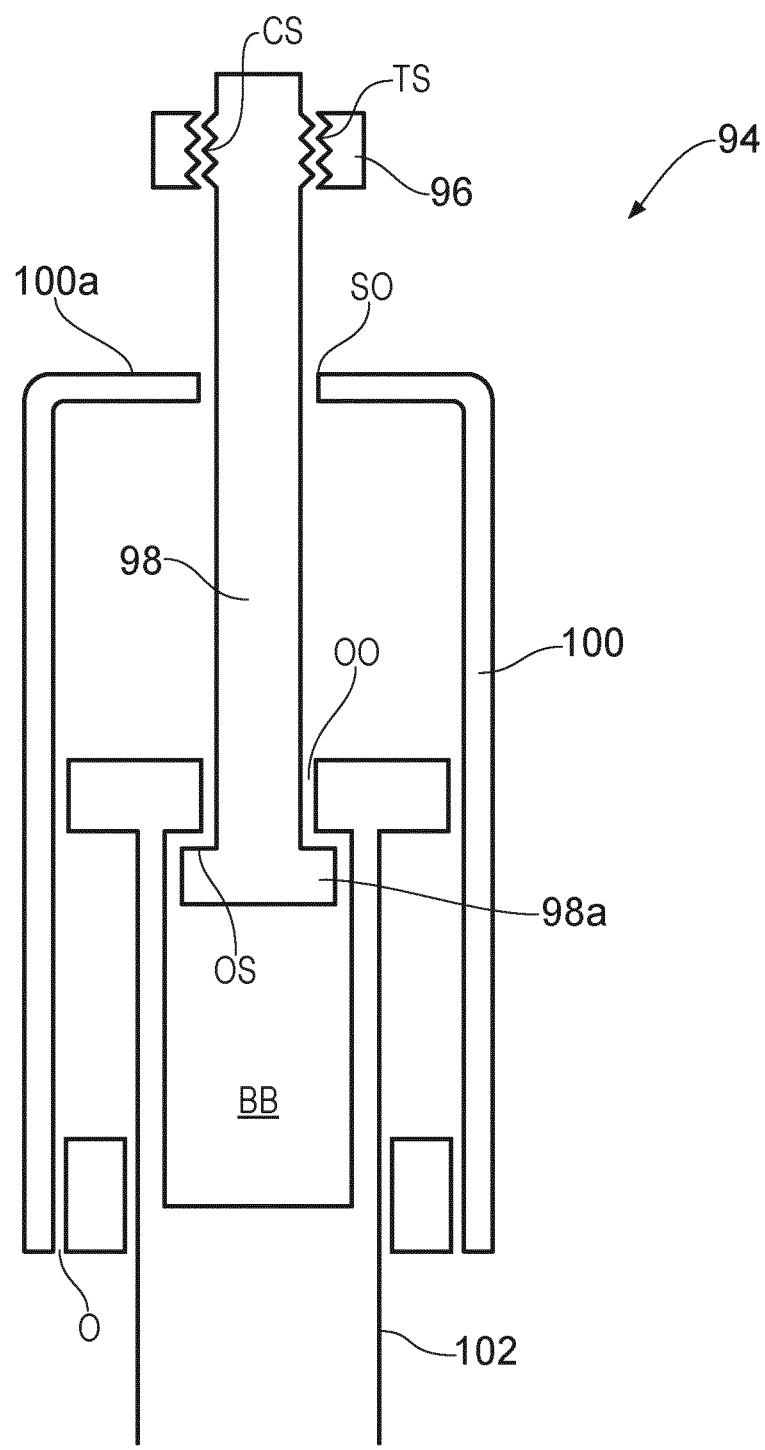
FIG. 8 is a schematic diagram of an aircraft landing gear shock absorber strut according to an embodiment of the invention.

While in the embodiments described above the rotatable member is disposed within the bore of the outer cylinder, in an alternative embodiment shown in FIG. 8 the shock absorber strut 94 has a rotatable member 96 disposed outside of the shock absorber. An inner cylindrical surface of the rotatable member 96 defines the threaded surface TS.

The outstop OS is defined by an orifice support tube 98 having a first end within the outer cylinder 100 and defining a radially enlarged head 98a disposed within a blind bore BB of the inner cylinder 102. The opening OO of the blind bore BB is of smaller diameter than the radially enlarged head 98a of the orifice support tube 98. The orifice support tube 98 has a second end region which projects out of a second opening SO in an opposite axial face 100a of the outer cylinder with respect to the main opening O, the second end region defining the threaded counter surface CS.

Figure 12:
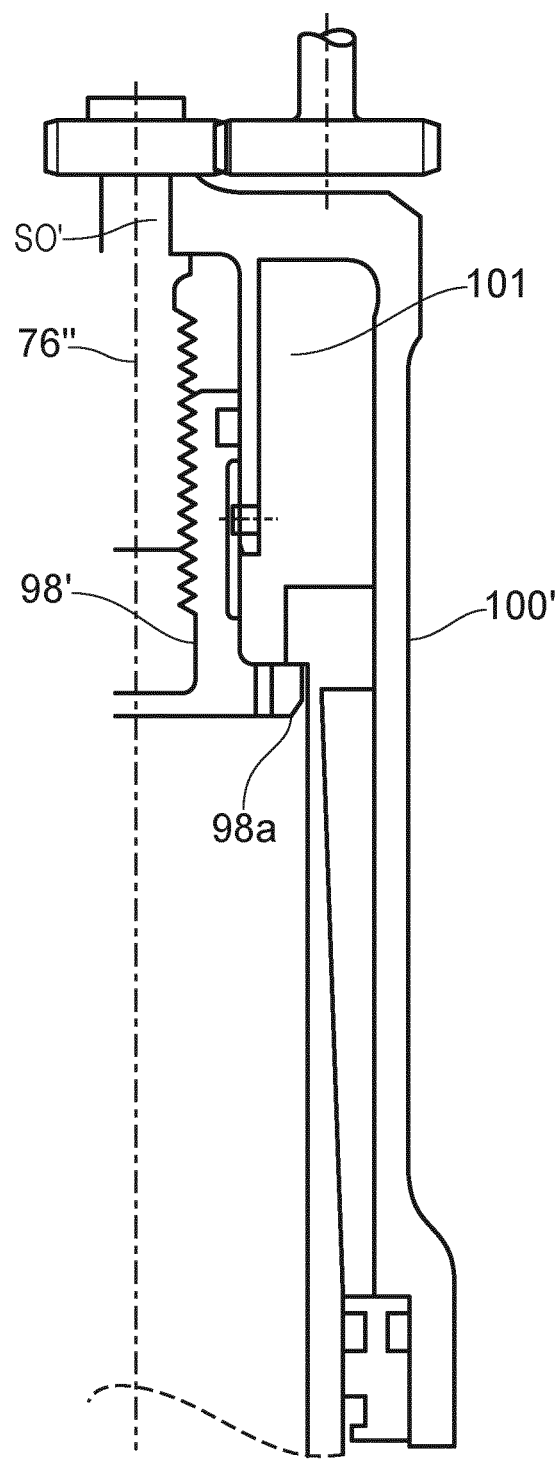
FIG. 12 is a schematic diagram of an aircraft landing gear shock absorber strut according to an embodiment of the invention which is similar to that of FIG. 8.

In an alternative embodiment of this type, shown in FIG. 12, the rotatable member 96' disposed outside of the shock absorber but us in the form of a threaded rod which extends though the second opening SO' at the top of the outer cylinder 100' to threadingly engage an inner surface of an orifice support tube 98' having a radially enlarged head 98a' defining the outstop. The orifice support tube 98' is slidingly disposed within, and keyed against rotation relative to, a supporting cylinder 101 which extends from the upper wall of outer cylinder 100'.

Figure 9:
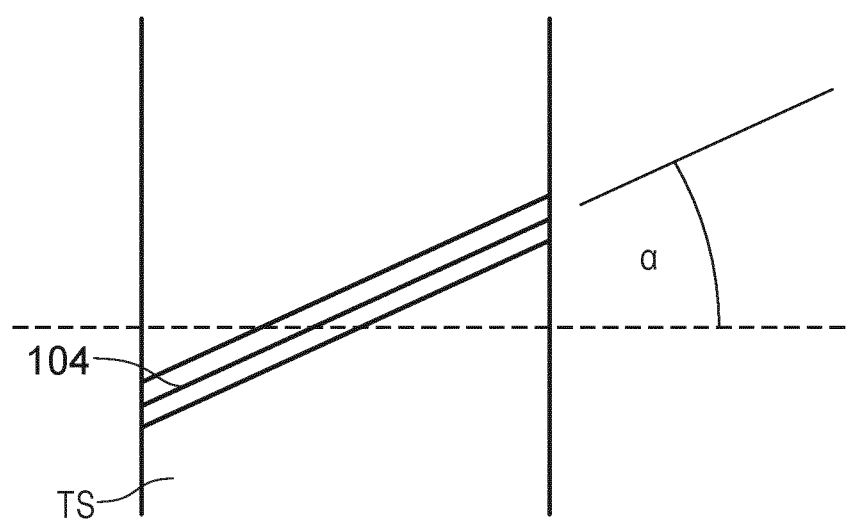
FIG. 9 is a schematic diagram illustrating the helix angle of a threaded surface and counter surface which can be used in embodiments of the invention.

Referring now to FIG. 9, in any embodiment, the threads 104 of the threaded surface TS can have a screw helix angle α which is less than 45 degrees. It is preferred that the screw helix angle is between 0.1 degree and five degrees so as to provide a balance between being highly resistant to back-driving and axial movement of the outstop due to rotation of the rotatable member.

The threaded surface can have at least three threads 104, preferably between six and 100 threads 104. The threaded surface and/or member defining the outstop can be sized to shorten the shock absorber strut by at least 15% and preferably by between 15% and 40% and in one example, by 30%. Such arrangements can enable aircraft to benefit from a shortening device on the landing gear while still providing sufficient stroke to land safely in the event of a component of a shortening device failing. The landing gear would still be shortened on one side but with significant travel remaining and other functions such as braking will still be available.

Indicator switches or sensors (not shown) could be used to warn the pilot of an incorrect shortening position. This can also be used to inhibit retraction of the landing gear if it not correctly shortened prior to retraction, if using a powered drive unit rather than a mechanical connection related to retraction angle. Moreover, the pilot can be warned that the gear is still partially compressed by such indication means upon deployment.

While in the described embodiments the outstop includes a threaded counter surface CS arranged in mating engagement with the threaded surface TS, which can increase the amount of contact surface area used to drive the outstop and react back-driving from the spring force, it will be appreciated that less preferred arrangements could be used such as a point contact that can moved along the path of the threaded surface TS.

In any embodiment, the outstop can be moveably coupled to the outer cylinder so as to permit axial movement relative to the outer cylinder but inhibit rotation with the rotatable member. This can provide efficient conversion of rotation of the rotatable member into axial movement of the outstop.

In any embodiment, the rotatable member can be driven by any suitable means, such as an electric motor, hydraulic motor, pneumatic motor, or by mechanical drive (e.g. bevel gear and gearbox from the pintle axis or other airframe attachment, or from another part of the landing gear, driven by relative motion during retraction for example. Where an external motor is provided to act through the sidewall of the outer cylinder, anti-rotation can alternatively be a prong on the gland rather than a key or dowel as illustrated.

Components of the aircraft landing gear and/or shock absorber strut struts according to embodiments of the invention can be implemented from conventional aerospace materials, such as titanium, aluminium and/or steel for structural members, polymer or metal bearings etc.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention can be implemented by means of hardware comprising several distinct elements. In a device claim enumerating several parts, several of these parts can be embodied by one and the same item of hardware. The mere fact that certain measures are recited in mutually different dependent claims does not indicate that a combination of these measures cannot be used to advantage.

The invention claimed is:

1. An aircraft landing gear shock absorber strut comprising:
    an outer cylinder having a bore defining an opening;
    an inner cylinder having a first end region movably coupled within the bore and a second end region which projects out of the opening, the inner cylinder being arranged to move along a longitudinal axis of the bore between a first condition in which the shock absorber strut is compressed and a second condition in which the shock absorber strut is extended, the inner cylinder being biased by a spring force to assume the second condition;
    a mechanical outstop arranged to engage an abutment surface of the inner cylinder to limit extension of the shock absorber strut; and
    a rotatable member distinct from the inner cylinder and defining a threaded surface configured to drive the outstop axially as the rotatable member is rotated by at least 360 degrees to move the inner cylinder from the second condition towards the first condition to compress the shock absorber strut, the rotatable member being arranged such that the spring force cannot rotate the rotatable member to allow the shock absorber strut to extend, and the outer cylinder includes a drive passage through the sidewall for a rotatable drive member to engage an outer surface of the rotatable member to cause rotation of the rotatable member.

2. The aircraft landing gear shock absorber strut according to claim 1, wherein the threads of the threaded surface have a screw helix angle less than 45 degrees.

3. The aircraft landing gear shock absorber strut according to claim 1, wherein the threaded surface comprises at least three threads.

4. The aircraft landing gear shock absorber strut according to claim 1, wherein the outstop includes a threaded counter surface arranged in mating engagement with the threaded surface.

5. The aircraft landing gear shock absorber strut according to claim 1, wherein the outstop is moveably coupled to the outer cylinder so as to permit axial movement relative to the outer cylinder but inhibit rotation with the rotatable member.

6. The aircraft landing gear shock absorber strut according to claim 1, wherein the inner cylinder includes a radially enlarged head at the first end region having an axial face defining the abutment surface.

7. The aircraft landing gear shock absorber strut according to claim 1, wherein the rotatable member is mounted at least partially within the bore, within an annulus between the inner cylinder and outer cylinder.

8. The aircraft landing gear shock absorber strut according to claim 1, wherein the rotatable member comprises a first hollow cylindrical member having an inner cylindrical surface portion defining the threaded surface and the outstop is defined by an axial face of a second hollow cylindrical member having an outer cylindrical surface portion defining the threaded counter surface, the inner diameter of the first cylindrical member being greater than the outer diameter of the second cylindrical member such that the second cylindrical member can be driven axially into and out of the first cylindrical member.

9. The aircraft landing gear shock absorber strut according to claim 1, further comprising a dynamic seal provided between the drive bore and the drive pin, wherein the dynamic seal is smaller in size to a conventional dynamic seal located in the gland member.

10. The aircraft landing gear shock absorber strut according to claim 1, wherein the outstop is defined by a tube such as an orifice support tube having a first end within the outer cylinder and defining a radially enlarged head disposed within a blind bore of the inner cylinder, the opening of the blind bore being of smaller diameter than the radially enlarged head of the tube, the tube having a second end region which projects out of a second opening in an opposite axial face of the outer cylinder with respect to the opening, the second end region defining the threaded counter surface.

11. The aircraft landing gear assembly of claim 1, wherein the rotatable member is arranged and configured to not move axially as the rotatable member is rotated by at least 360 degrees to move the inner cylinder from the second condition towards the first condition to compress the shock absorber strut.

12. The aircraft landing gear assembly of claim 1, wherein the outstop is arranged and configured to not rotate as the rotatable member is rotated by at least 360 degrees to move the inner cylinder from the second condition towards the first condition to compress the shock absorber strut.

13. The aircraft landing gear shock absorber strut according to claim 1, wherein the rotatable member comprises a hollow cylindrical collar, the inner surface of which defines the threaded surface.

14. The aircraft landing gear shock absorber strut according to claim 13, wherein the outstop is defined by an axial face of an annular gland member arranged to seal the shock absorber strut, the inner diameter of the rotatable member being greater than the outer diameter of the gland, the outer cylindrical surface of the gland defining the threaded counter surface.

15. An aircraft landing gear assembly comprising:
the aircraft landing gear shock absorber strut according to claim 1; and
a wheel or other ground contacting assembly coupled to the shock absorber strut.

16. An aircraft landing gear shock absorber strut comprising:
an outer cylinder having a bore defining an opening;
an inner cylinder having a first end region movably coupled within the bore and a second end region which projects out of the opening, the inner cylinder being arranged to move along a longitudinal axis of the bore between a first condition in which the shock absorber strut is compressed and a second condition in which the shock absorber strut is extended, the inner cylinder being biased by a spring force to assume the second condition;
a mechanical outstop arranged to engage an abutment surface of the inner cylinder to limit extension of the shock absorber strut; and
a rotatable member distinct from the inner cylinder and defining a threaded surface configured to drive the outstop axially as the rotatable member is rotated by at least 360 degrees to move the inner cylinder from the second condition towards the first condition to compress the shock absorber strut, the rotatable member being arranged such that the spring force cannot rotate the rotatable member to allow the shock absorber strut to extend, and
the shock absorbing strut comprises an annular gland member arranged to seal the shock absorber strut, the gland member including a drive bore through which a rotatable drive pin extends, the gland further including a threaded bore communicating with the drive bore and defining the threaded counter surface, the rotatable member comprising a finger member having a first end region defining the threaded portion and being in mating engagement with the threaded bore and a second end defining the outstop, the drive pin being coupled to the finger member via a keyed slot arranged to permit relative axial movement between the drive pin and finger member and inhibit relative rotation between the drive pin and finger member.

17. The aircraft landing gear assembly of claim 16, wherein the rotatable member is arranged and configured to not move axially as the rotatable member is rotated by at least 360 degrees to move the inner cylinder from the second condition towards the first condition to compress the shock absorber strut.

18. The aircraft landing gear assembly of claim 16, wherein the outstop is arranged and configured to not rotate as the rotatable member is rotated by at least 360 degrees to move the inner cylinder from the second condition towards the first condition to compress the shock absorber strut.

19. An aircraft landing gear shock absorber strut comprising:
an outer cylinder having a bore defining an opening;
an inner cylinder having a first end region movably coupled within the bore and a second end region which projects out of the opening, the inner cylinder being arranged to move along a longitudinal axis of the bore between a first condition in which the shock absorber strut is compressed and a second condition in which the shock absorber strut is extended, the inner cylinder being biased by a spring force to assume the second condition;

a mechanical outstop arranged to engage an abutment surface of the inner cylinder to limit extension of the shock absorber strut; and a rotatable member distinct from the inner cylinder and defining a threaded surface configured to drive the outstop axially as the rotatable member is rotated by at least 360 degrees to move the inner cylinder from the second condition towards the first condition to compress the shock absorber strut, the rotatable member being arranged such that the spring force cannot rotate the rotatable member to allow the shock absorber strut to extend, and the outstop is defined by a tube having a first end within the outer cylinder and defining a radially enlarged head disposed within a blind bore of the inner cylinder, the opening of the blind bore being of smaller diameter than the radially enlarged head of the tube, the tube having a second end region which projects out of a second opening in an opposite axial face of the outer cylinder with respect to the opening, the second end region defining the threaded counter surface.

* * * * *